(12) United States Patent
Backstrom et al.

(10) Patent No.: US 10,180,342 B2
(45) Date of Patent: Jan. 15, 2019

(54) LEVEL FINDING USING MULTIPLE SEARCH STEPS

(71) Applicant: Honeywell International Inc., Morristown, NJ (US)

(72) Inventors: Johan Backstrom, North Vancouver (CA); Sarabjit Singh, Andhra Pradesh (IN); Iouri Markevitch, Vancouver (CA); Stephane Savard, Vancouver (CA); Michael Kon Yew Hughes, Vancouver (CA); Frank Martin Haran, North Vancouver (CA)

(73) Assignee: Honeywell International Inc., Morris Plains, NJ (US)

(*) Notice: Subject to any disclaimer, the term of this patent is extended or adjusted under 35 U.S.C. 154(b) by 552 days.

(21) Appl. No.: 14/859,694

(22) Filed: Sep. 21, 2015

(65) Prior Publication Data

US 2016/0097669 A1 Apr. 7, 2016

Related U.S. Application Data

(60) Provisional application No. 62/058,358, filed on Oct. 1, 2014.

(51) Int. Cl.
*G01F 23/284* (2006.01)
*G01F 23/296* (2006.01)
(Continued)

(52) U.S. Cl.
CPC .......... *G01F 23/284* (2013.01); *G01F 23/296* (2013.01); *G01S 7/292* (2013.01);
(Continued)

(58) Field of Classification Search
CPC .. G01F 23/284; G01F 23/296; G01F 23/0076; G01S 7/292; G01S 7/527;
(Continued)

(56) References Cited

U.S. PATENT DOCUMENTS 5,315,562 A * 5/1994 Bradley ................ G01S 15/104
367/89
5,422,860 A * 6/1995 Bradley ................ G01S 15/104
367/89

(Continued)

FOREIGN PATENT DOCUMENTS

| CA | 2350816 A1 * | 12/2002 | ........... G01N 29/032 |
| FR | 2925169 A1 * | 6/2009 | ............. G10S 7/412 |
| RU | 2410650 C2 * | 1/2011 | |

*Primary Examiner* — Timothy A Brainard
*Assistant Examiner* — Nuzhat Pervin

(57) ABSTRACT

A method of level finding includes providing characteristics of a shape of a transmitted pulse in time domain launched onto a waveguide into a tank having at least one material therein, physical properties of the waveguide and real and imaginary dielectric characteristics of the material at a frequency of the pulse. A level finding algorithm having a coarse search and a fine search is implemented, where the coarse search minimizes a prediction error between an echo signal (echo curve y(k)) and a sampled pulse model echo p(k) to obtain an objective function J(k) in a vicinity of a minimum prediction error (k*). The fine search calculates at least one minimum or maximum using J(k) in the vicinity of k*. The minimum or the maximum corresponds to a level of the material or an interface involving the material.

20 Claims, 5 Drawing Sheets

(51) Int. Cl.
  *G01S 7/292* (2006.01)
  *G01S 7/527* (2006.01)
  *G01S 13/88* (2006.01)
  *G01S 15/88* (2006.01)
  *G01S 7/486* (2006.01)

(52) U.S. Cl.
  CPC .............. *G01S 7/527* (2013.01); *G01S 13/88* (2013.01); *G01S 15/88* (2013.01); *G01S 7/4866* (2013.01)

(58) Field of Classification Search
  CPC ........ G01S 13/88; G01S 15/88; G01S 7/4866; G01S 7/414; G01S 15/104; F41G 7/343; G01C 21/005
  USPC ......................................................... 342/124
  See application file for complete search history.

(56) References Cited

U.S. PATENT DOCUMENTS

| | | | | |
|---|---|---|---|---|
| 5,424,742 A * | 6/1995 | Long | ................... | G01C 21/005 342/25 C |
| 5,430,445 A * | 7/1995 | Peregrim | ................ | F41G 7/343 342/25 C |
| 5,486,833 A * | 1/1996 | Barrett | ................... | G01S 7/414 342/204 |
| 6,972,712 B1 | 12/2005 | Karlsson | | |
| 7,965,087 B2 * | 6/2011 | Reimelt | ................ | G01F 23/284 324/533 |
| 8,159,386 B2 * | 4/2012 | Malinovskiy | ......... | G01F 23/284 342/118 |
| 9,081,087 B2 * | 7/2015 | Spanke | ................ | G01F 23/284 |
| 2004/0257269 A1 * | 12/2004 | Laun | .................... | G01F 23/284 342/124 |
| 2005/0285777 A1 * | 12/2005 | Karlsson | ............... | G01F 23/284 342/124 |
| 2009/0158839 A1 * | 6/2009 | Spanke | ................ | G01F 23/284 73/290 V |
| 2009/0302867 A1 * | 12/2009 | Schroth | ................. | G01F 23/284 324/642 |
| 2010/0070209 A1 * | 3/2010 | Sai | ........................ | G01F 23/284 702/55 |
| 2011/0094299 A1 * | 4/2011 | Muller | ................ | G01F 23/0076 73/290 V |
| 2014/0104098 A1 * | 4/2014 | Linden | .................. | G01F 23/284 342/124 |

* cited by examiner

LEVEL FINDING USING MULTIPLE SEARCH STEPS

CROSS REFERENCE TO RELATED APPLICATIONS

This application claims the benefit of Provisional Application Ser. No. 62/058,358 entitled "TIME DOMAIN REFLECTOMETRY (TDR) SIGNAL PROCESSING", filed Oct. 1, 2014, which is herein incorporated by reference in its entirety.

FIELD

Disclosed embodiments relate to level finding using time domain reflectometry (TDR) and level measurement gauges and systems therefrom.

BACKGROUND

Level measurement technologies include ultrasound and radar typically being Guided Wave Radar (GWR). Newer level measurement devices are TDR-based that utilize sound or echo-based measurement whether ultrasound or GWR. GWR is a contact radar technique to measure the level of liquids or solids in a tank using time TDR principles.

GWR works by generating a stream of pulses of electromagnetic energy and propagating transmitted pulses down a transmission line formed into a level sensing probe. The probe is generally placed vertically in a tank or other container and the electromagnetic pulse is launched downward from the top of the probe. The probe is open to both the air and the material to be sensed in such a way that the electromagnetic fields of the propagating pulse penetrate the air until they reach the level of the material. At that point, the electromagnetic fields see the higher dielectric constant of the material. This higher dielectric constant causes a reduction in the impedance of the transmission line, resulting in a pulsed reflected (echo) signal back to the top of the probe. The pulse travels through the air dielectric portion of the probe at a known velocity. This allows the material level and an interface thickness (if present) to be determined by a peak finding algorithms that identifies peak(s) in the pulse echo curve.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize known peak finding algorithms used to find peaks in echo curves for a time domain reflectometry (TDR)-based level measurement system for determining the distance to a material level and interface thickness (if present) operate without a-priori knowledge of the transmitted pulse being used, the physical properties of the waveguide, and medium in the tank being into account. Such methods then leave it to the user to then define a threshold array to pick out peaks of interest in the echo curve to determine the material level and interface(s) if present.

Disclosed multiple search step level finding algorithms automatically determine the level of a material (material level) in a tank and interface(s) if present from a reflection signal (echo curve) and a sampled pulse model echo, which generally include two search steps, an initial coarse search, then and a fine search. Level readings provided by disclosed level finding algorithms are more accurate and require less expert knowledge of the user as compared to known peak finding algorithms, in one embodiment being for relatively difficult guided wave radar (GWR) applications such as for measuring an interface or for determining the material level in turbulent conditions. Although generally described for GWR applications (contact pulsed radar), disclosed level finding can also be applied to ultrasound and non-contacting radar.

DETAILED DESCRIPTION

Figure 1:
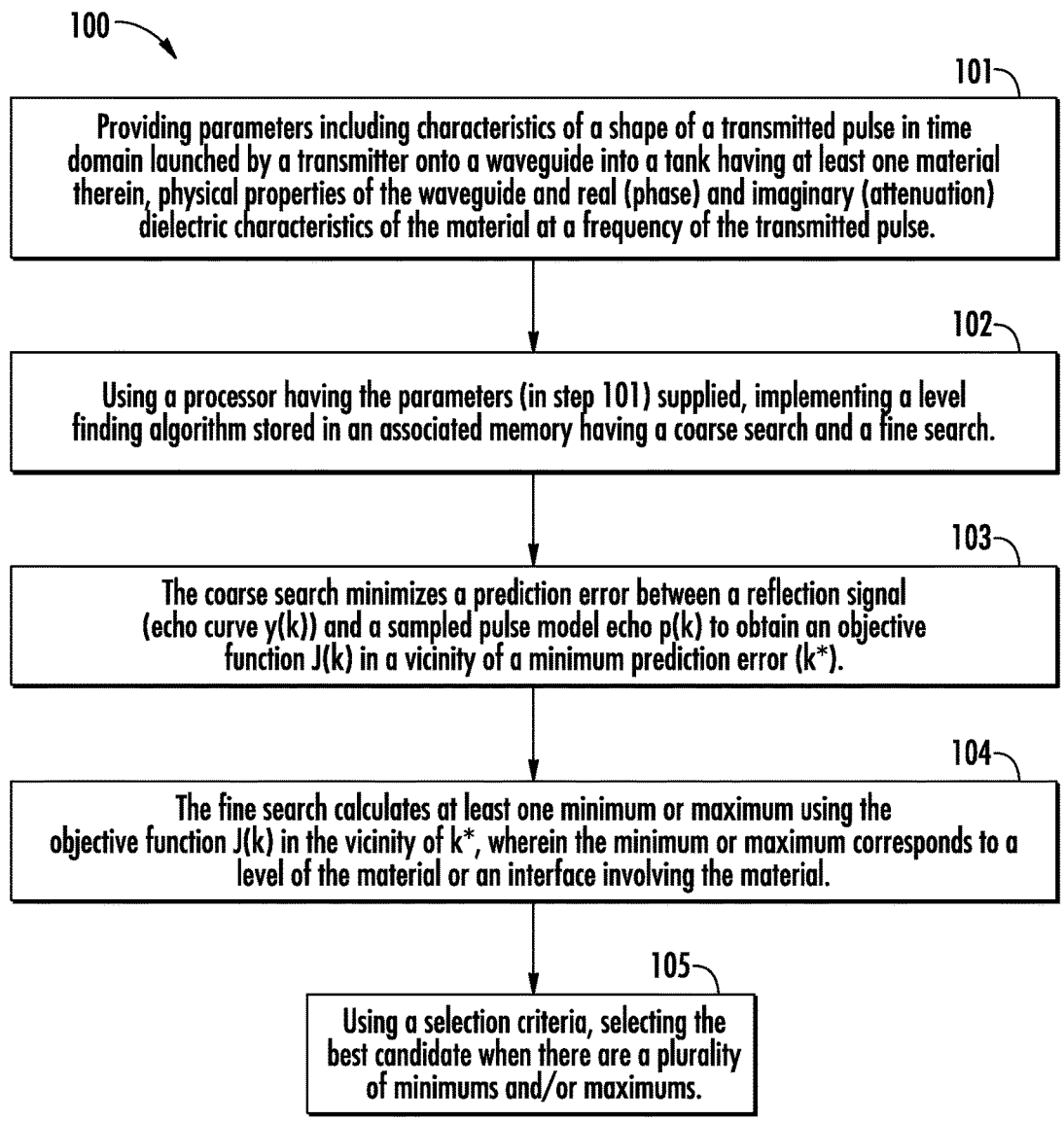
FIG. 1 is a flow chart that shows steps in an example method of level finding, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in an example method 100 of level finding, according to an example embodiment. Disclosed embodiments determine the material level in a tank including two search steps from a reflection signal (echo curve) and a sampled pulse model echo, using an initial coarse search, then and a finer search. Although generally not needed, third or more successively finer searches may also be added. As noted above, although disclosed level finding is generally described for GWR applications, disclosed embodiments can also be applied to ultrasound and non-contacting radar.

Step 101 comprises providing parameters including characteristics of a shape of a transmitted pulse (modeled or actual) in the time domain (e.g., pulse width and amplitude) launched by a transmitter onto a waveguide (or probe) into a tank having at least one material therein, physical properties of the waveguide, and dielectric characteristics of the material. To obtain the dielectric characteristics of the material one can simulate or more typically measure the dielectric characteristics of the material in the tank at the desired operating pulse frequency or frequencies. Step 102 comprises using a processor having these parameters supplied, implementing a level finding algorithm having a coarse search and then a fine search that is stored in an associated memory. The processor can comprise a microprocessor, microcontroller, digital signal processor (DSP), field programmable gate array (FPGA), application specific integrated circuit (ASIC), or discrete logic devices. The memory can be on the processor chip, or can be a separate memory.

Step 103 comprises the coarse search where reflection candidates $x_k^*$ are found in the measured echo curve $y(x_k)$ by evaluating a performance index $J(x_k)$ that can be a norm of the prediction error vector $[\bar{y}(x_k)-\bar{p}(x_k)]$ where $x_k=k\Delta x$ is the discrete sample distance, $k \in [0, N-1]$ is an integer, N is the number of samples in the echo curve, $\Delta x$ is the sample distance, and $\bar{p}$ is the sampled pulse model echo. Step 104 comprises the fine search calculating at least one minimum or maximum using the objective function $J(x_k)$ in the vicinity of $x_k^*$, wherein the minimum or maximum $x^*$ corresponds to a level of the material or an interface involving the material in sub-sample resolution where the sample resolution is given by $\Delta x$, where the center of the reflections, not peaks, are identified. In case there are a set (2 or more) reflection candidates, step 105 can be added comprising using a selection criteria (such as the minimum value of the objective function) to select the best candidate in the set of candidates.

Step 101 to 104 and optionally step 105 are evaluated for all echo reflections of interest. This includes but is not limited to a reference plane (flange), upper product surface, lower product surface, and the end of probe (or waveguide). The distance to the upper product surface $d_{upperProduct}$ is calculated as the difference between the best reflection candidate for the upper product and the reference plane:

$$d_{upperProduct} = \frac{x^*_{upperProduct} - x^*_{referencePlane}}{2},$$

and similarly for lower product and end of probe.

Figure 2:
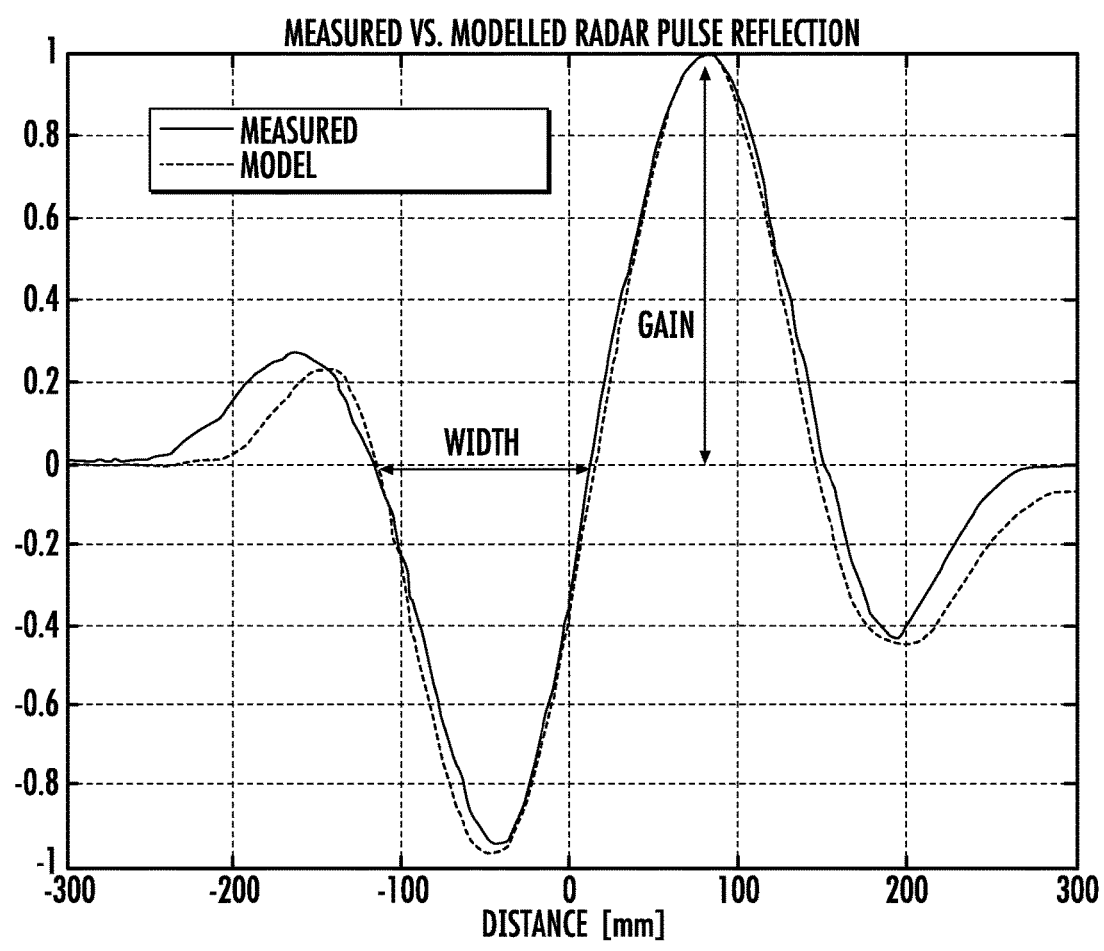
FIG. 2 shows a measured versus a modelled radar reflection pulse, according to an example embodiment.

For example, for the coarse search:
1. A parameterized model $p_O(x_m)=f(x_m,g,w)$ or a measured nearly-perfectly-reflected ultrasound or radar pulse (e.g., transmitted pulse measured after passing through only the receive circuitry of the gauge) is obtained. Here g is a gain or amplitude parameter, w is a width parameter, $x_m=m\Delta x$ is the discrete sample distance, $m \in [-M,M]$ is an integer, and $\Delta x$ is the sample distance. An example of a parameterized model radar pulse reflection versus the actual measured radar pulse reflection is shown in FIG. 2. The gain or amplitude g (shown in FIG. 2 as the gain) is governed by the amplitude/gain of the transmitted pulse and the dielectric characteristics of the material in the tank that the reflected pulse travels through.
2. A time/distance pulse model $\bar{p}(x_k)=e^{-\alpha x_k}\bar{p}_0$, $\bar{p}_0=[p_0(x_{-M}), \ldots, p_0(x_M)]$ formed that adjusts an amplitude of the modeled pulse echo signal using a linear attenuation parameter $\alpha$, where $\alpha$ is a function of the waveguide and the material in the tank in which the pulse is travelling. The term $e^{-\alpha x_k}$ models the radar or ultrasound pulse energy that is lost to its surroundings or is lost due to being absorbed by the waveguide.
3. Reflection candidates (for the center of the reflections) are found in the measured echo curve $y(x_k)$ by evaluating a performance index $J(x_k)$ that is a norm of the prediction error vector $[\bar{y}(x_k)-\bar{p}(x_m)]$. For an example with the Euclidean norm, see in eq. (1) below.

$$J(x_k) = \frac{1}{2M+1}\|\bar{y}(x_k) - \bar{p}(x_k)\|^2 = \qquad (1)$$

$$\frac{1}{2M+1}\sum_{m=-M}^{M}(y(x_k+m) - e^{-\alpha x_k}p_0(x_m))^2$$

$$\bar{x}_k^* = \{x_k \mid J(x_k) < \theta\}$$

$$x_k = k\Delta x,$$

$$k \in [0, N-1]$$

$$x_m = m\Delta x$$

Here $\bar{p}(x_k)$ is the radar or ultrasound pulse reflection model, $x_k$ is the discrete distance, $\Delta x$ is the sample distance, M is the half window width of the reflection model, $\bar{x}_k^*$ is the set of discrete distances for the reflection candidates, $\theta$ is the performance index threshold, and N is number of samples in the echo curve. It is noted that norms other than the Euclidean norm can be used in this step.
4. $\bar{y}(x_k)$ and $\bar{p}(x_k)$ are optionally down sampled or decimated for efficiency in the coarse search.
5. The objective function $J(x_k)$ at $\bar{x}_k^*$ is then subject to a fine search.

In the fine search an interpolation technique is used to find a continuous representation of $J(x_k^*)$, which can then be minimized analytically. An example fine search can include:
1. Forming a $2^{nd}$ order polynomial representation (curve fit) of $J(x_k^*)$, $J_c(x)=a_2x^2+a_1x+a_0$ in the vicinity of $x_k^*$.
2. Using linear least squares to find the optimal polynomial coefficients $\{a_0, a_1, a_2\}^*$,
3. Calculating the fine search reflection distance candidates $x^*=\text{argmin}_x J_c(x), \forall x_k^* \in \bar{x}_k^*$ which can be solved analytically and $\bar{x}^*=[x_1^*, \ldots, x_n^*]$. The fine search candidates are the reflection candidates of interest at sub-sample accuracy.

It is noted that other interpolation and curve fitting techniques can be used, such as higher order polynomial or non-polynomial functions.

In case the set of final reflection distance candidates $\bar{x}^*$ contains more than one candidate an additional candidate selection criterion can be applied as described above relative to step 105. The selection criterion may be different depending on the reflection in question, such as whether reflection in question is from the reference plane, upper product surface, lower product surface (interface), or the end of probe. In its simplest form, the selection criterion corresponds to the minimum value of the objective function:

$$x^{**} = \underset{j}{\mathrm{argmin}} J_c(x_j^*)$$

Other possible selection criteria can be used, such as using prior knowledge of where the level was in previous time intervals to make the best decision. Instead of the lowest minimum, one can select the first minimum below threshold as it is likely a level as opposed to a second reflection. One can also reject reflections at distance/time integer multiples of the first reflection as they are likely false.

Figure 3:
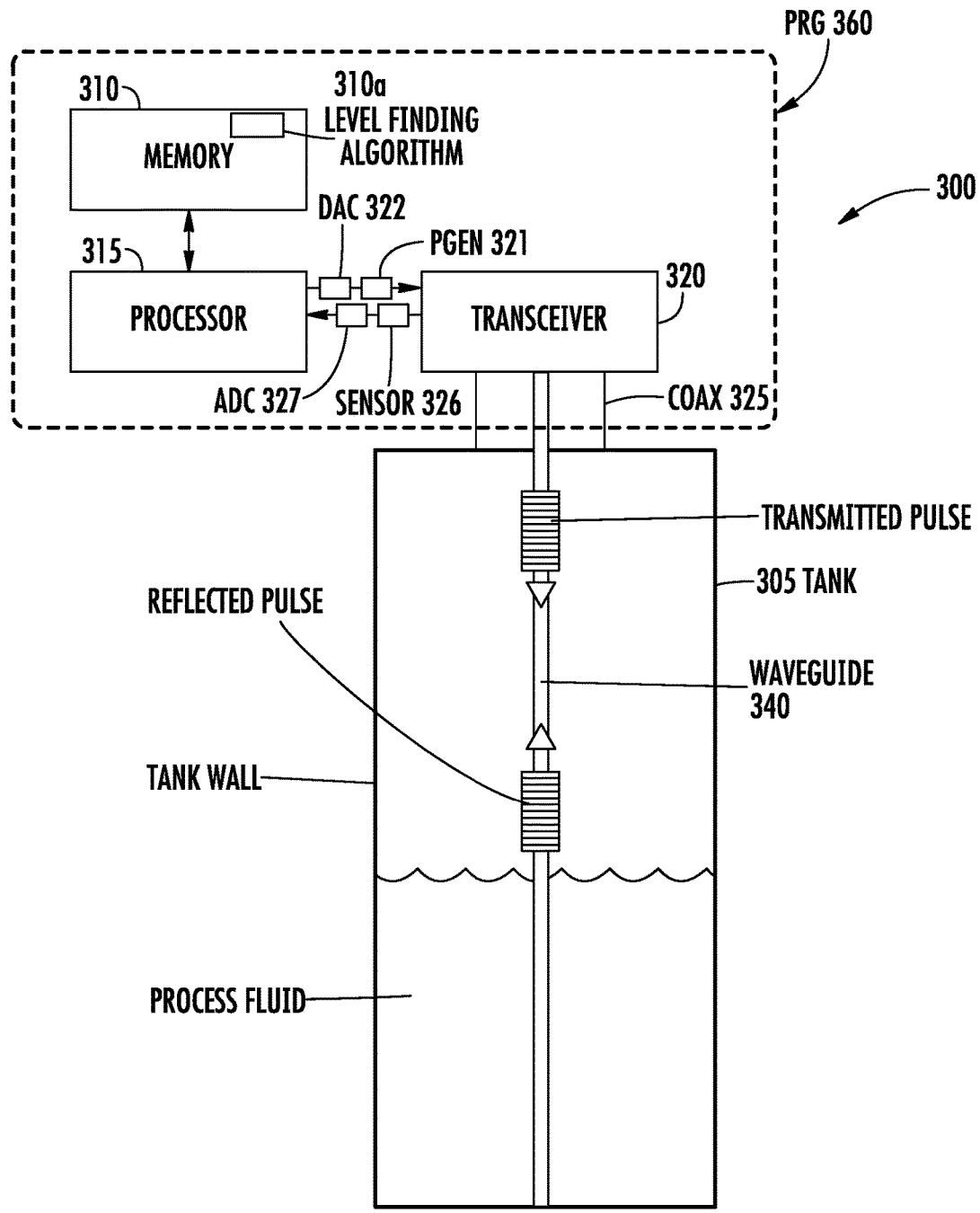
FIG. 3 depicts an example pulsed radar system shown as a GWR system that a disclosed level finding algorithm which is shown implemented in the firmware of a memory associated with a processor, according to an example embodiment.

FIG. 3 depicts an example pulsed radar or ultrasound level finding system shown as a GWR system 300 that includes a pulsed radar or ultrasound level gauge shown as a pulse radar level gauge (PRG) 360 including a disclosed level finding algorithm 310*a* is shown implemented in the firmware of memory 310 associated with a processor 315, according to an example embodiment. Also shown is a transceiver 320 and coaxial connector 325 that is on the top of the tank 305. The transmitter and the receiver provided by transceiver 320 may be implemented as separate blocks. Accordingly, a transceiver as used herein includes both of these arrangements.

In the transmit direction the processor 315 provides digital signal levels to a digital to analog converter (DAC) 322 which is connected to an input of a pulse generator (PGen) block 321 that is coupled to the transmitter of the transceiver 320. In the receive direction, the receiver of the transceiver 220 receives reflected echo signals that are transduced by the sensor 326, where the output signal from the sensor 326 is coupled to an analog-to-digital converter (ADC) 327 which converts analog signals from the sensor 326 into digital signals for the processor 315 to process which functions as a signal analyzer. Many pulses are generated and the ADC 327 generates the waveform comprising many discrete voltage values that are synchronized by a clock circuit.

A flange (not shown) may also be present. The waveguide (or probe) is shown as 340. As noted above, although generally described for GWR applications, disclosed level finding can also be applied to ultrasound and non-contacting radar.

Examples

Disclosed embodiments are further illustrated by the following specific Examples, which should not be construed as limiting the scope or content of this Disclosure in any way.

Figure 4:
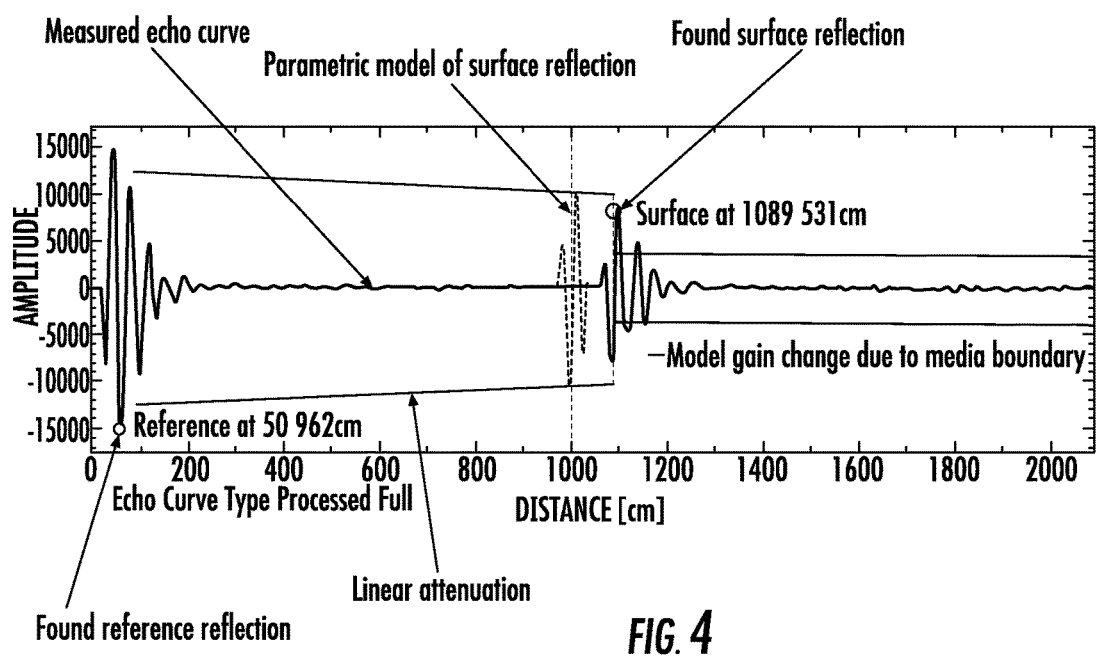
FIG. 4 is an example illustration of a measured echo curve and a parametric model of the surface reflection, according to an example embodiment.

FIG. 4 illustrates results from an example parametric model and an actual measured echo curve. This example also shows the found reference reflection and the surface (upper product) reflection for a single liquid application, the linear attenuation $e^{-\alpha x_k}$, and how the model gain g has a step change at the surface boundary due to the difference in dielectric constant between the vapor and the measured material.

Figure 5A:
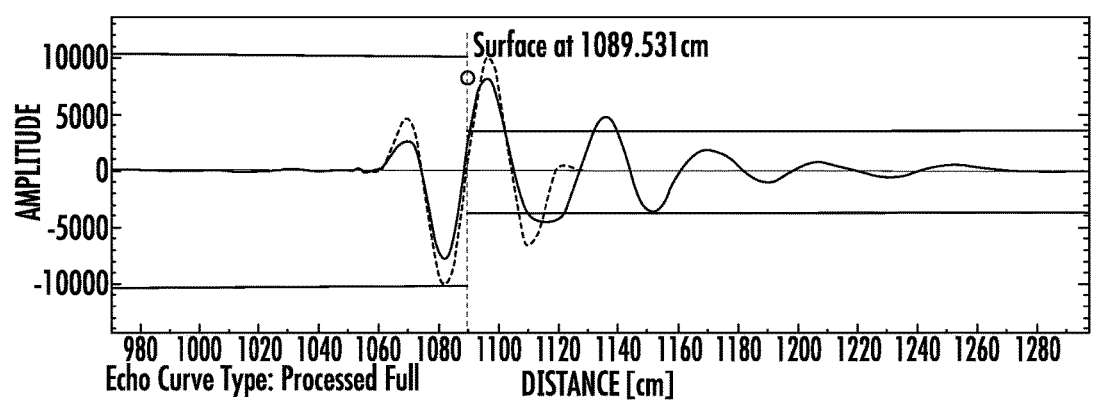
FIG. 5A is an overlay of an example surface reflection model and measured echo curve.
Figure 5B:
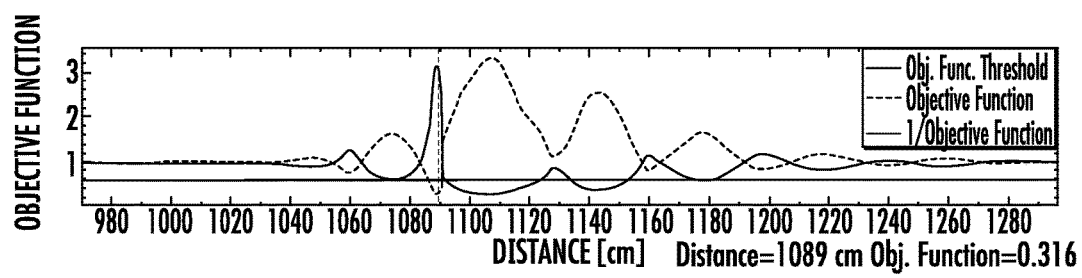
FIG. 5B shows an example objective function and its threshold, according to example embodiments.

FIG. 5A shows the upper product surface reflection model overlaid on the measured echo curve at the location of the upper product surface. FIG. 5B shows the corresponding objective function and its threshold.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of level finding, comprising:
providing parameters including characteristics of a shape of a transmitted pulse in time domain launched by a transmitter onto a waveguide into a tank having at least one material therein, physical properties of said waveguide and real (phase) and imaginary (attenuation) dielectric characteristics of said material at a frequency of said transmitted pulse;
using a processor having said parameters supplied and implementing a level finding algorithm having a coarse search and a fine search stored in an associated memory:
said coarse search minimizing a prediction error between a reflection signal (echo curve y(k)) and a sampled pulse model echo p(k) to obtain an objective function J(k) in a vicinity of a minimum prediction error (k*), and
said fine search calculating at least one minimum or maximum using said J(k) in said vicinity of said (k*), wherein said minimum or said maximum corresponds to a level of said material or an interface involving said material.

2. The method of claim 1, wherein said transmitted pulse is a modeled pulse and said y(k) is a modeled echo signal.

3. The method of claim 1, wherein said transmitted pulse is obtained from a measured nearly-perfectly-reflected pulse at said frequency after passing through receive circuitry and wherein said y(k) is an actual echo signal.

4. The method of claim 1, wherein said transmitted pulse comprises a radar pulse.

5. The method of claim 1, wherein said transmitted pulse comprises an ultrasound pulse.

6. The method of claim 4, wherein said waveguide contacts said material, and wherein said method comprise guided wave radar (GWR).

7. The method of claim 1, wherein said fine search calculates a plurality of said minimums or maximums, further comprising selecting a best one from said plurality of said minimums or maximums using a selection criteria and using said best one for said determining said level of said material or said interface involving said material.

8. A computer program product, comprising:
a non-transitory data storage medium that includes program instructions executable by a processor to enable said processor to execute a method of level finding having a coarse search and a fine search, said computer program product including:
code for accessing parameters including characteristics of a shape of a transmitted pulse in time domain launched by a transmitter onto a waveguide into a tank having at least one material therein, physical properties of said waveguide and real (phase) and imaginary (attenuation) dielectric characteristics of said material at a frequency of said transmitted pulse;

code for said coarse search including minimizing a prediction error between a reflection signal (echo curve y(k)) and a sampled pulse model echo p(k) to obtain an objective function J(k) in a vicinity of a minimum prediction error (k*), and code for said fine search after said coarse search calculating at least one minimum or maximum using said J(k) in said vicinity of said k*, wherein said minimum or said maximum corresponds to a level of said material or an interface involving said material.

9. The computer program product of claim 8, wherein said transmitted pulse is a modeled pulse and said is a modeled echo signal.

10. The computer program product of claim 8, wherein said transmitted pulse is obtained from a measured nearly-perfectly-reflected pulse at said frequency after passing through receive circuitry and wherein said y(k) is an actual echo signal.

11. The computer program product of claim 8, wherein said transmitted pulse comprises a radar pulse.

12. The computer program product of claim 8, wherein said transmitted pulse comprises an ultrasound pulse.

13. The computer program product of claim 11, wherein said waveguide contacts said material, and wherein said method comprises guided wave radar (GWR).

14. The computer program product of claim 8, wherein said fine search calculates a plurality of said minimums or maximums, further comprising selecting a best one from said plurality of said minimums or maximums using a selection criteria and using said best one for said determining said level of said material or said interface involving said material.

15. A pulsed radar or ultrasound level gauge (level gauge), comprising:

a processor having an associated memory storing a level finding algorithm having a coarse search and a fine search;

a pulse generator (PGen) block that is coupled to receive control signals originating from said processor; a transceiver for coupling to a waveguide in a tank having at least one material therein having an input coupled to an output of said PGen block for transmitting transmitted pulses and an output coupled through a sensor to an input of said processor for processing echo signals received responsive to said transmitted pulses;

said level finding algorithm when implemented by said processor having provided parameters including characteristics of a shape of said transmitted pulses in time domain, physical properties of said waveguide and real (phase) and imaginary (attenuation) dielectric characteristics of said material at a frequency of said transmitted pulses causing:

said coarse search minimizing a prediction error between said echo signal (echo curve y(k)) and a sampled pulse model echo p(k) to obtain an objective function J(k) in a vicinity of a minimum prediction error (k*), and said fine search calculating at least one minimum or maximum using said J(k) in said vicinity of said k*, wherein said minimum or said maximum corresponds to a level of said material or an interface involving said material.

16. The level gauge of claim 15, wherein said transmitted pulse is a modeled pulse and said y(k) is a modeled echo signal.

17. The level gauge of claim 15, wherein said transmitted pulse is obtained from a measured nearly-perfectly-reflected pulse at said frequency after passing through receive circuitry and said y(k) is an actual echo signal.

18. The level gauge of claim 15, wherein said transmitted pulse comprises a radar pulse, wherein said waveguide is for contacting said material, and wherein said level gauge comprises guided wave radar (GWR) level gauge.

19. The level gauge of claim 15, wherein said transmitted pulse comprises an ultrasound pulse.

20. The level gauge of claim 15, wherein said fine search calculates a plurality of said minimums or maximums, further comprising selecting a best one from said plurality of said minimums or maximums using a selection criteria and using said best one for said determining said level of said material or said interface involving said material.

* * * * *